United States Patent
Rieskamp et al.

(10) Patent No.: US 12,498,711 B2
(45) Date of Patent: Dec. 16, 2025

(54) COMPUTER-IMPLEMENTED METHOD AND CONDITION MONITORING DEVICE FOR DETECTING MECHANICAL DAMAGE TO A MACHINE

(71) Applicant: Siemens Aktiengesellschaft, Munich (DE)

(72) Inventors: Timo Rieskamp, Munich (DE); Martin Brückel, Bayern (DE); Sibel Senturk, İstanbul (TR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 19/082,247

(22) Filed: Mar. 18, 2025

(65) Prior Publication Data
US 2025/0298407 A1  Sep. 25, 2025

(30) Foreign Application Priority Data
Mar. 25, 2024 (EP) .................................. 24165922

(51) Int. Cl.
  G05B 23/02 (2006.01)
  G01M 1/14 (2006.01)
  G06F 17/18 (2006.01)
(52) U.S. Cl.
  CPC ........... G05B 23/0254 (2013.01); G01M 1/14 (2013.01); G05B 23/024 (2013.01); G06F 17/18 (2013.01)
(58) Field of Classification Search
  CPC ... G05B 23/0254; G05B 23/024; G01M 1/14; G06F 17/18
  See application file for complete search history.

(56) References Cited

U.S. PATENT DOCUMENTS

| | | | | |
|---|---|---|---|---|
| 2020/0285997 | A1* | 9/2020 | Bhattacharyya | .......... G06N 7/01 |
| 2022/0058481 | A1* | 2/2022 | Odagaki | ................. G06F 17/18 |

FOREIGN PATENT DOCUMENTS

| | | | |
|---|---|---|---|
| CN | 102155988 A | * | 8/2011 |
| CN | 102831325 A | * | 12/2012 |

(Continued)

OTHER PUBLICATIONS

Lee Wo Jae et al:"Time to failure prediction of rotating machinery using dynamic feature extraction and gaussian process regression", The International Journal of Advanced Manufacturing Technology, Springer, London, Bd. 130; Nr. 5-6; Dec. 27, 2023 (Dec. 27, 2023); Seiten 2939-2955; XP037951523; ISSN: 0268-3768; DOI: 10.1007/S00170-023-12799-8.

*Primary Examiner* — John C Kuan
(74) *Attorney, Agent, or Firm* — Schmeiser, Olsen & Watts, LLP (57) ABSTRACT

A computer-implemented method for detecting mechanical damage to a machine based on a performance indicator present at a rotation speed of the machine is provided, including the steps of: receiving a number of calibration data points during a calibration period, each comprising the rotation speed of the machine and a performance characteristic value associated with the rotation speed, calibrating an AI-based Gaussian process regressor, by inputting the calibration data points received during the calibration period and outputting an estimated performance curve and an uncertainty range assigned to each value of the performance curve for all rotation speed values, receiving a data point to be evaluated, and comparing the data point to be evaluated with the estimated performance curve, and outputting an anomaly message if the data point to be evaluated is outside a specified limit value, which is dependent on the uncertainty range of the performance characteristic value.

13 Claims, 3 Drawing Sheets

(56) References Cited

FOREIGN PATENT DOCUMENTS

| CN | 114239181 A | * | 3/2022 | |
|---|---|---|---|---|
| CN | 114812798 A | * | 7/2022 | ............. G01H 17/00 |
| DE | 102021213112 A1 | | 5/2023 | |
| DE | 102021214518 A1 | | 6/2023 | |
| KR | 20210059271 A | * | 5/2021 | |

* cited by examiner

COMPUTER-IMPLEMENTED METHOD AND CONDITION MONITORING DEVICE FOR DETECTING MECHANICAL DAMAGE TO A MACHINE

CROSS-REFERENCE TO RELATED APPLICATIONS

This application claims priority to EP Application No. 24165922.6, having a filing date of Mar. 25, 2024, the entire contents of which are hereby incorporated by reference.

FIELD OF TECHNOLOGY

The following relates to a computer-implemented method for detecting mechanical damage to a machine based on a performance indicator present at a rotation speed of the machine, a condition monitoring device which carries out embodiments of the method, and a corresponding computer program product.

BACKGROUND

A condition monitoring system is used to monitor the condition of machines and equipment and to detect potential problems at an early stage. Based on historical sensor data such as temperature or vibration data of the machine or system, deviations from a "normal state" are detected via data analysis methods and actions are initiated if necessary. By detecting these deviations from a normal state early, maintenance cycles can be optimized and unplanned downtime can be avoided.

A major challenge is to learn this "normal state" of the machine. Furthermore, a fast commissioning is desired, i.e., the condition monitoring system should be able to detect deviations from the normal state of the machine after the shortest possible calibration time. From a system perspective, however, this assumes that sufficient data exists to learn a "normal state" from a variety of states of the machine.

When monitoring the condition of machines, especially machines and their industrial applications, vibration is an important measure for detecting mechanical faults such as bearing damage, axis misalignments or imbalances. In practice, various performance indicators, or KPIs for short, are often derived from high-resolution vibration data, are monitored over a longer period of time, and algorithms for trend detection and anomaly detection are applied to these temporal performance curves.

Electric motors, in particular, which are operated with the aid of a converter in different speed ranges exhibit, among other things due to resonance effects, very different vibration behaviour in different speed ranges, which makes the comparability of the derived KPIs difficult. Therefore, when analyzing performance indicators derived from vibration data the operating point of the motor must be taken into account. However, this requires that the condition monitoring system has enough historical data from the different operating points of the motor during productive operation so that a statement can be made about a possible anomaly in a certain speed range. This cannot be ensured, especially in a period directly after the motor has been commissioned.

SUMMARY

An aspect of embodiments of the invention is to provide predictions for performance indicators after a short calibration time, i.e., based on a small amount of historical data, and to do so in a trustworthy manner. A further aspect is to make predictions for performance indicators at previously unobserved or hardly observed operating points of the machine.

A first aspect of the embodiments relates to a computer-implemented method for detecting mechanical damage to a machine based on a performance indicator dependent on a rotation speed of the machine, comprising the steps of:
- receiving a number of calibration data points during a calibration period, each comprising the rotation speed of the machine and a performance characteristic value associated with the rotation speed, and which have been determined from sensor data of the machine operated at one or more operating points,
- calibrating an AI-based Gaussian process regressor, by inputting the calibration data points received during the calibration period and outputting an estimated performance curve and an uncertainty range assigned to each value of the performance curve for all rotation speed values in a specified rotation speed range which indicate a normal state of the machine,
- receiving a data point to be evaluated in an evaluation period after the calibration period, and
- comparing the data point to be evaluated with the estimated performance curve, and
- outputting an anomaly message if the data point to be evaluated is outside at least one specified limit value which is dependent on the uncertainty range of the performance characteristic value.

In an advantageous manner, the Gaussian process regressor not only predicts a performance curve but also models an uncertainty for each performance characteristic value. Due to the uncertainty range, the calibration time of such a system can be significantly reduced, as there is no need for sufficient data points to be available for all operating points. Each data point, i.e., each calibration data point as well as each data point to be evaluated, comprises the rotation speed and the performance characteristic value determined at the rotation speed. The uncertainty range allows the trustworthiness of each data point to be evaluated.

In an embodiment, the Gaussian process regressor comprises a statistical model for the regression and prediction of data points, comprising a covariance function for modelling a relationship between input and output values, wherein hyperparameters of the covariance function are adjusted by the calibration. The performance curve is a mean value determined by the Gaussian process regressor and the uncertainty range is a standard deviation determined by the Gaussian process regressor.

In an embodiment, the distance of the data point to be evaluated from the mean value is calculated and compared with the standard deviation for the data point on the performance curve.

In other words, for each data point to be evaluated, i.e., the performance characteristic determined at the rotation speed, the distance to the estimated performance characteristic value is determined on the estimated performance curve and compared with the uncertainty range. This prevents the evaluation of an erroneous anomaly message for a data point at a rotation speed with a large uncertainty range.

In an embodiment, the performance curve comprises a performance characteristic value for all rotation speed values within a specified rotation speed range.

The performance curve can thus be used for all those data points to be evaluated whose rotation speed is in the rotation speed range.

In an embodiment, the Gaussian process regressor is recalibrated at specified time intervals with further data points.

The performance curve and thus a recalibration of the Gaussian process regressor only needs to be performed in order to improve the accuracy. The process is thus optimized in terms of processor capacity. When the calibration process is outsourced to a remote server, the evaluation of the data points to be evaluated can be carried out by a simply structured device in the vicinity of the machine.

An increased number of data points per time unit is received during the calibration period compared to the evaluation period.

This means that the calibration period can be shortened or the amount of calibration data for recalibration can be increased and thus the calibration result can be improved, i.e., a more accurate performance curve can be output.

Data points received during the previous operating period of the machine are used as new calibration data points.

In an embodiment, the rotation speed is derived from magnetic field data and the performance characteristic value is derived from vibration data, which are measured on the machine.

This provides a physically reliable relationship between the values of the data points and machine parameters measured directly on the machine.

In an embodiment, a deterioration message is output when the number of anomaly messages for data points received within a specified time period exceeds a specified limit value.

The deterioration message can actively draw attention to a worsening of the condition of the machine. Different criticality levels can be implemented for the machine in the event of a plurality of specified, in particular increasing, limit values.

In an embodiment, the estimated performance curve and the uncertainty range assigned to each value of the performance curve as well as the data point to be evaluated is output on a graphical user interface.

By displaying the condition of the machine and its behaviour over the entire rotation speed range and optionally over time, maintenance personnel receive an early and comprehensive indication of maintenance work or an impending hazardous situation.

In an embodiment, the mechanical damage is a bearing damage or a misalignment of the axes of the machine or an imbalance of the machine.

The anomaly messages can identify the most common causes of machine operation degradation.

According to a further aspect, the embodiments relate to a condition monitoring device for detecting mechanical damage to a machine based on a performance indicator present at a rotation speed of the machine, comprising at least one processor configured to carry out the following steps:

receiving a number of calibration data points during a calibration period, each comprising the rotation speed of the machine and a performance characteristic value associated with the rotation speed, and which have been determined from sensor data of the machine operated at one or more operating points, calibrating an AI-based Gaussian process regressor, by inputting the calibration data points received during the calibration period and outputting an estimated performance curve and an uncertainty range assigned to each value of the performance curve for all rotation speed values in a specified rotation speed range which indicate a normal state of the machine, receiving a data point to be evaluated in an evaluation period after the calibration period, and comparing the data point to be evaluated with the estimated performance curve, and outputting an anomaly message if the data point to be evaluated is outside at least one specified limit value which is dependent on the uncertainty range of the performance characteristic value.

The described condition monitoring device is able to carry out robust anomaly detection with relatively few data points and to model the dependence of performance indicators, also referred to as KPIs, on the rotation speed for machine damage in a sufficiently precise manner. Even if the rotary machine, in particular the motor, is operated in a different operating state at a later time after a calibration phase, a statement can be made as to what extent this is an anomaly.

According to a further aspect, the embodiments relates to a computer program product (non-transitory computer readable storage medium having instructions, which when executed by a processor, perform actions) comprising a non-volatile computer-readable medium which can be loaded directly into a memory of at least one digital computer, comprising program code parts which, when the program code parts are executed by at least one digital computer, cause the at least one digital computer to carry out the steps of embodiments of the method.

A computer program product, such as a computer program means, can be provided or supplied, for example, as a computer-readable storage medium, in the form of a memory card, USB stick, CD-ROM, DVD or in the form of a downloadable file from a server in a network.

BRIEF DESCRIPTION

Some of the embodiments will be described in detail, with reference to the following figures, wherein like designations denote like members, wherein.

DETAILED DESCRIPTION

The elements shown and their proportions to one another should fundamentally not be considered to be true to scale; instead, individual elements can be shown with relatively larger dimensions for better illustration and/or for better comprehension.

Unless otherwise specified in the description below, the terms "receive", "calibrate", "compare", "output" and the like, refer to actions and/or processes and/or processing steps that modify and/or generate data and/or convert the data to other data, wherein the data may be represented or be present in particular as physical variables, for example as electrical pulses.

The condition monitoring device and the components contained therein, such as at least one data interface, a regressor unit, an evaluation unit or an output interface and the like can comprise one or more processors. A processor may in particular be a main processor (central processing unit, CPU), a microprocessor or a microcontroller, for example an application-specific integrated circuit or a digital signal processor, possibly in combination with a memory unit for storing program commands, etc.

DETAILED DESCRIPTION OF THE EXEMPLARY EMBODIMENTS

Figure 1:
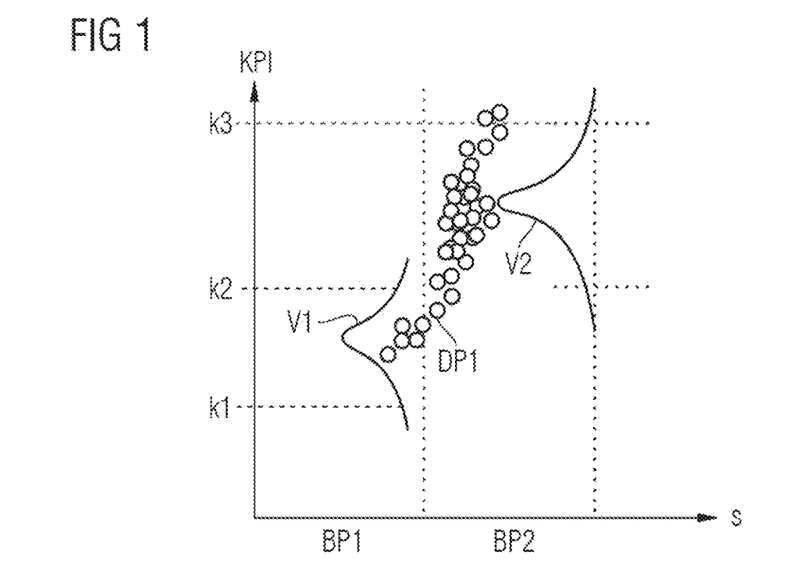
FIG. 1 shows an exemplary schematic representation of data points recorded on a machine with two operating points.

Previous condition monitoring systems either do not relate the performance indicators, in the following also referred to synonymously as KPIs, derived from vibration data or motor current data to the current operating point of a machine or divide the possible bandwidth of a rotation speed s, for example, into a number of fixed operating points BP1, BP2, as shown in FIG. 1. This approach has its drawbacks, however. If derived KPIs, which could be a measure of the extent of a motor damage, are not set in relation to the operating point, identifying a clear trend or detecting an anomaly of these KPIs is very difficult as they could fluctuate significantly with the operating point.

Dividing into individual, strictly separated operating points BP1, BP2, as shown in FIG. 1, only partially solves this problem. If, for example, outlier detection is performed based on distributions V1, V2 of previous data points in the respective operating points BP1, BP2 and threshold values k1, k2 or k2, k3 are defined for data points that are outside a certain confidence interval, the following problem may arise.

Although the dependence of the performance indicator KPI on the rotation speed s of the machine exhibits an almost linear and therefore not abnormal behaviour, the two derived distributions V1, V2 are nonetheless very different. For example, a data point DP1, which lies just to the right of the dividing line of the two operating points BP1 and BP2, would be in a normal range for operating point B1, but would be recognized as an anomaly with respect to operating point BP2, since it lies far outside distribution V2, here below the threshold k2.

Classifying into a series of operating points BP1, B2 thus cannot be done arbitrarily or could in some cases lead to false positive detections. Since the specific vibration behaviour over the speed range can be very different from motor to motor and is not known in detail in practice, it is not possible to make a meaningful selection of the limit values.

Therefore, when analyzing performance indicators derived from vibration data the operating point of the motor must be taken into account. However, this requires that a data-based, machine learning-based condition monitoring system has enough historical data from the different operating points of the motor during productive operation so that a statement can be made about a possible anomaly in a certain speed range. This cannot be ensured, especially in a period directly after the motor has been commissioned.

Figure 2:
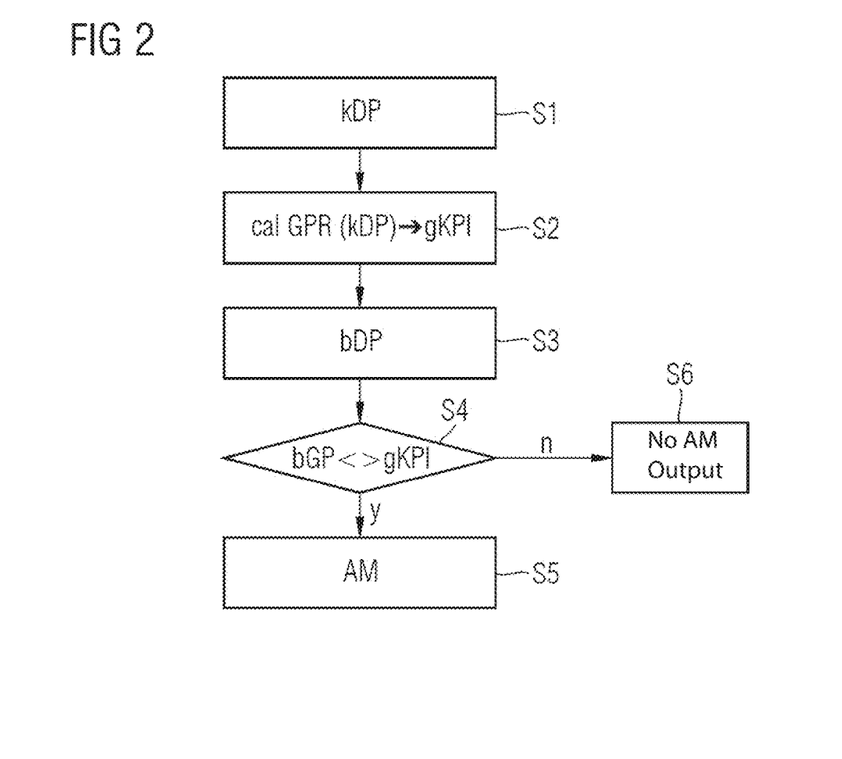
FIG. 2 shows an exemplary embodiment of the method for detecting mechanical damage to a machine in the form of a flow diagram.

The proposed computer-implemented method for detecting mechanical damage of a rotary machine, for example, achieves this aspect. FIG. 2 schematically shows an exemplary sequence of embodiments of the method in the form of a flow diagram.

A basic idea of embodiments of the method is to model performance characteristic values, which are based on vibration data as an indicator of mechanical motor damage and are highly speed-dependent, by a Gaussian process regressor. In detail, the following steps are carried out:

A number of calibration data points kDP, each comprising the rotation speed of the machine and a performance characteristic value associated with the rotation speed, are received during a calibration period, see step S1. The rotation speed is determined from sensor data of the machine operated at one or more operating points. The rotation speed is derived from magnetic field data and the performance characteristic value is derived from vibration data which are measured on the machine.

In step S2, the AI-based Gaussian process regressor GPR is calibrated by inputting the calibration data points kDP received during the calibration period. The calibrated Gaussian process regressor GPR provides an estimated performance curve gKPI and an uncertainty range assigned to each value of the performance curve for all rotation speed values in a specified rotation speed range. This estimated performance curve gKPI indicates a normal state of the machine.

This completes the calibration of the Gaussian process regressor GPR, and the estimated performance curve gKPI can be used to evaluate data points recorded during machine operation. Accordingly, a data point to be evaluated bDP is received in an evaluation period after the calibration period, see S3. The data point bDP is compared with the corresponding performance indicator of the estimated performance curve gKPI at the rotation speed of the data point bDP, see S4. An anomaly message AM is output if the data point to be evaluated bDP is outside at least one specified limit value, wherein at least one limit value is dependent on the uncertainty range of the performance characteristic value, see S5.

An anomaly message AM is output if the evaluated data point bDP is outside the uncertainty range, i.e., if the performance characteristic value of the data point bDP is larger than an upper, maximum performance characteristic value of the uncertainty range or if the performance characteristic value of the data point is smaller than the lower, minimum performance characteristic value of the uncertainty range. The limit value may also be set within and/or outside the uncertainty range.

If the data point bDP to be evaluated is within the specified limit values, no anomaly message is output, see step S6. In this case, an optional "normal state message" can be output confirming that the machine is in a normal state within the specified limit values. This can be illustrated, for example, by outputting the evaluated data point in a performance curve diagram, as shown in FIG. 3.

The Gaussian process regressor GDP comprises a statistical model for the regression and prediction of data points. It uses a covariance function to model a relationship between input and output values. The hyperparameters of the covariance function are estimated during calibration using the received calibration data points kDP in order to fit the regressor. This model calculates predictions for new input values by generating a probability distribution over possible output values. The Gaussian process regressor GDP also provides an uncertainty assessment for its predictions.

In this specific case, the model provides a continuous function that describes the dependence of the performance characteristic values on the rotation speed in a specified rotation speed range and thus represents an estimated performance curve. In addition, the model provides a statement about the uncertainty in this rpm or rotation speed range.

Figure 3:
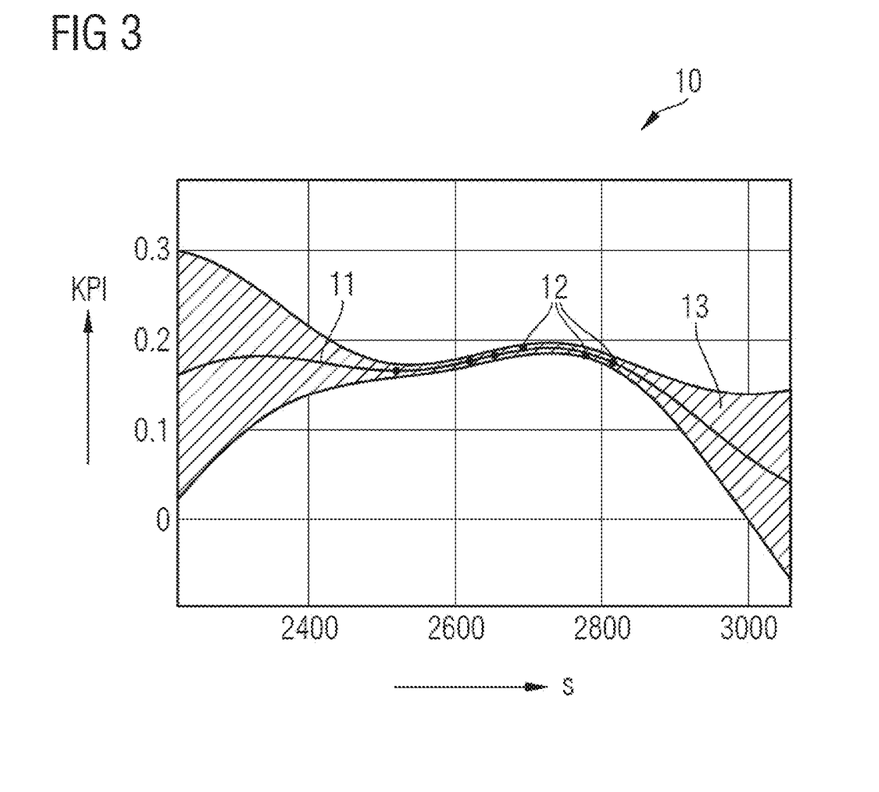
FIG. 3 shows an exemplary embodiment of an estimated performance curve with an uncertainty range determined by the method.

FIG. 3 shows an example of an estimated performance curve 11 on a specified rotation speed range, which characterizes normal operation of a machine, and which is output by a Gaussian process regressor based on approximately ten received calibration data points 12.

The diagram 10 shows the performance curve 11, which represents the dependence between performance characteristic values and rotation speed s modelled with the Gaussian process regressor. A shaded area shows a confidence interval, such as a 90% confidence interval, indicating the uncertainty range 13. This means that the uncertainty range 13 contains the true value of the performance metric with 90% probability. It can be seen that the dependence is not linear. In a rotation speed range between 2600 revolutions per minute and 2700 revolutions per minute, a linear increase can be seen, but in the range of 2800 revolutions per minute, the performance indicator decreases again with increasing rotation speed. Since the scatter here is low, the uncertainty of embodiments of the method is very low and therefore sensitive to outliers. However, in the ranges below 2400 revolutions per minute and above 2900 revolutions per minute, the uncertainty increases sharply, since here no calibration data points exist from which a "normal state" could be derived with a high degree of reliability. Nevertheless, it is possible to make a rough statement, since based on the previous calibration data points 12 a continuous function representing the performance curve 11 has been learned, which describes the curve in the best possible way and takes into account the uncertainty of embodiments of the method.

As this uncertainty can be modelled with the aid of the Gaussian process, the calibration time for such a method and for a condition monitoring device that carries out embodiments of the method can be significantly reduced, since it is not absolutely necessary to have sufficient calibration data points available for all operating points of the machine. At the same time, embodiments of the method are robust against false positive anomaly detection and corresponding anomaly messages.

The Gaussian process regressor is recalibrated at specified time intervals with further data points, which are recorded on the machine at a later time. This increases the accuracy of the resulting newly estimated performance curve and uncertainty range.

Figure 4:
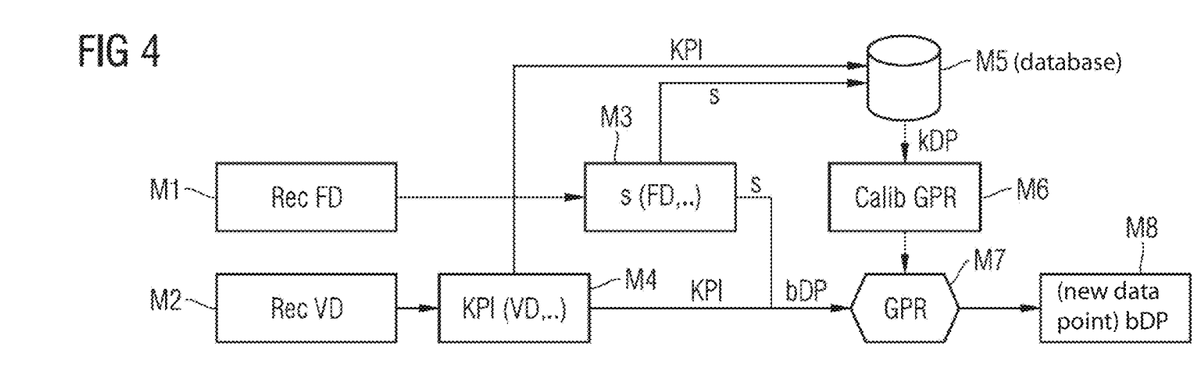
FIG. 4 shows an exemplary sequence of the method during a calibration and an evaluation period in a schematic representation.

FIG. 4 shows an exemplary embodiment of the method with details on recalibrating the Gaussian process regressor and a resulting recalibrated estimated performance curve.

Using sensors on a machine to be monitored, short, high-resolution snapshots of vibration data VD and magnetic field data FD are recorded at time intervals of a calibration period, as well as optional further data for calculating the machine speed, see M1, M2. In such a high-resolution snapshot, a large amount of vibration data VD and magnetic field data FD is measured. The time intervals can be predefined cyclically, according to any other scheme, or can be triggered depending on one or more events.

From the magnetic field data FD, a current rotation speed s of the machine is then calculated at the time of recording, see M3, and stored, see M5. Performance characteristic values KPI are calculated from the vibration data VD using various signal processing methods, see M4, and these are also stored, for example in a database, see M5.

Both values coupled as a data point kDP, i.e., the rotation speed s and the associated performance characteristic values KPI, serve as input for calibrating a Gaussian process regressor or a regressor model, see M6, which calculates a Gaussian distribution for the given rotation speed s, which describes the "normal behaviour" of the machine in this speed range by a mean value and a standard deviation. The calibrated Gaussian process regressor GPR now provides this performance curve for condition monitoring, see M7.

A first number of N data points are used to fundamentally calibrate the regressor model. Data points recorded at a later time are then used for retraining purposes. Data points from such value ranges are used for retraining/recalibration, for which only a few data points are available. For example, during operation, data from a very high speed range is added, in which only a few data points are available and thus for which the behaviour of the machine can so far only be poorly predicted. The resulting performance curve comprises a performance characteristic value for all rotation speed values within a specified rotation speed range.

Subsequently, when monitoring the condition of the machine, which is referred to as the evaluation period, see M8, a new data point to be evaluated bDP is compared with the mean value in this range. For this purpose, the distance of the new data point to be evaluated bDP from the mean value is calculated and compared with the uncertainty range for this point on the performance curve. If the distance is larger than a specified limit value, for example, n times the standard deviation, the new data point to be evaluated is marked as an anomaly. An anomaly message is then issued. An increased number of data points per time unit is received during the calibration period compared to the evaluation period.

Data points to be evaluated can also be used as calibration data points.

In the event of developing mechanical damage, an increasing trend in performance characteristic values is to be expected for the data points to be evaluated. New data points to be evaluated would therefore drift toward higher performance characteristic values. Since the model parameters of the Gaussian process regressor are not changed for a certain period of time after recalibration, the distances between new performance characteristic values and the learned mean value would increase and, after a time, exceed a previously defined limit value of n times the standard deviation. An increase in detected anomalies and corresponding anomaly messages can detect such a trend and thus a deterioration of a mechanical fault. In a variant, embodiments of the method trigger an alert and issues a deterioration message.

Figure 5:
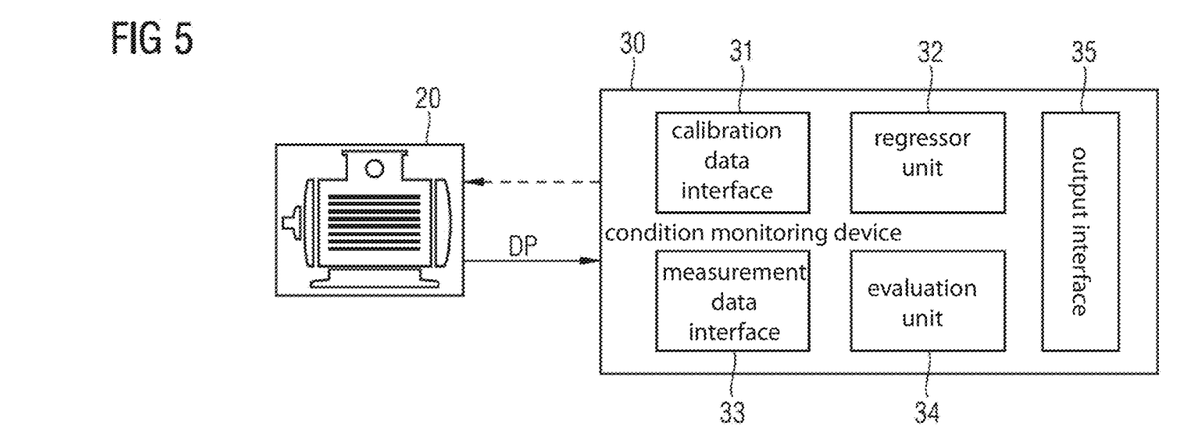
FIG. 5 shows an exemplary embodiment of the condition monitoring device in a block illustration.

FIG. 5 shows a condition monitoring device 30 for detecting mechanical damage of a machine 20 based on a performance indicator present at a rotation speed of the machine. The condition monitoring device 30 comprises at least one processor which is configured in such a way, a calibration data interface 31, a regressor unit 32, a measurement data interface 33, an evaluation unit 34 and an output interface 35.

The machine 20 is a rotary machine such as a motor, in particular an electric motor. Sensors on the machine 20 detect the field strength and vibrations of the machine. The rotation speed and one or more performance indicators of the machine, which are an indicator of mechanical damage, are derived from the sensor data. Forms of mechanical damage that can be detected via performance indicators include, for example, bearing damage, a misalignment of the axles of the machine and/or an imbalance of the machine.

The calibration data interface 31 is designed to receive a number of calibration data points during a calibration period, each comprising the rotation speed of the machine 20 and a performance characteristic value associated with the rotation speed, and which have been determined from sensor data of the machine operated at one or more operating points. Deriving the rotation speed and the performance indicator present at the rotation speed from the sensor data can optionally be carried out within the condition monitoring device 30.

The regressor unit 32 is designed to calibrate an AI-based Gaussian process regressor by inputting the calibration data points received in the calibration period and to output an estimated performance curve and an uncertainty range assigned to each value of the performance curve for all rotation speed values in a specified rotation speed range which indicates a normal state of the machine.

The measurement data interface 33 is designed to evaluate a data point to be evaluated in an evaluation period after the calibration period.

The evaluation unit 34 is designed to compare the data point to be evaluated with the estimated performance curve.

The output interface 35 is designed to output an anomaly message if the data point to be evaluated is outside at least one specified limit value which is dependent on the uncertainty range of the performance characteristic value. The output interface 35 is designed as a graphical user interface. The estimated performance curve and the uncertainty range assigned to each value of the performance curve as well as the data point to be evaluated are output on the graphical user interface.

A computer program product comprising a non-volatile computer-readable medium, which can be loaded directly into a memory of at least one digital computer, and comprising program code parts which, when the program code parts are executed by at least one digital computer, cause the at least one digital computer to carry out the steps of embodiments of the method described above and to work as a condition monitoring device.

In comparison to previous solutions, the described condition monitoring device 30 is able to carry out robust anomaly detection with only relatively few data points and to model the dependence of motor damage KPIs on the rotation speed in a sufficiently precise manner. Even if the motor is operated in a different operating state at a later time after the calibration phase, it can be stated to what extent this is an anomaly. As the number of data points increases, the behaviour of the machine 20 can be modelled in increasing detail over time by constantly retraining the Gaussian process regressor at regular intervals. This approach makes it possible to significantly reduce the calibration time of the condition monitoring system without significantly increasing the risk of false detection. This can significantly increase the performance of a condition monitoring system and therefore its acceptance.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for detecting mechanical damage to a machine based on a performance indicator present at a rotation speed of the machine, comprising:

using sensors on the machine to monitor sensor data comprising magnetic field data and vibration data;

receiving calibration data points during a calibration period, each comprising a value of the rotation speed of the machine and a performance characteristic value associated with the rotation speed, and which have been determined from the sensor data of the machine operated at one or more operating points, calibrating an AI-based Gaussian process regressor, by inputting the calibration data points received during the calibration period and outputting an estimated performance curve and an uncertainty range assigned to each value of the performance curve for all rotation speed values in a specified rotation speed range which indicate a normal state of the machine, receiving a data point to be evaluated in an evaluation period after the calibration period, and comparing the data point to be evaluated with the estimated performance curve, and outputting an anomaly message if the data point to be evaluated is outside at least one specified limit value, which is dependent on the uncertainty range of the performance characteristic value.

2. The method as claimed in claim 1, wherein the Gaussian process regressor comprises a statistical model for regression and prediction of data points, which is a covariance function for modelling a relationship between input and output values, wherein hyperparameters of the covariance function are adjusted by calibration.

3. The method as claimed in claim 1, wherein the performance curve comprises a mean value determined by the Gaussian process regressor, and the uncertainty range is a standard deviation determined by the Gaussian process regressor.

4. The method as claimed in claim 3, wherein a distance of the data point to be evaluated from the mean value is calculated and compared with the standard deviation for a data point on the estimated performance curve.

5. The method as claimed in claim 1, wherein the performance curve comprises a performance characteristic value for all rotation speed values within a specified rotation speed range.

6. The method as claimed in claim 1, wherein the Gaussian process regressor is recalibrated at specified time intervals with further calibration data points.

7. The method as claimed in claim 1, wherein an increased number of calibration data points per time unit is received during the calibration period compared to the evaluation period.

8. The method as claimed in claim 1, wherein the rotation speed is derived from the magnetic field data and the performance characteristic value is derived from the vibration data, which are measured on the machine.

9. The method as claimed in claim 1, wherein a deterioration message is output when a number of anomaly messages for data points, which were received within a specified time period, exceeds a specified limit value.

10. The method as claimed in claim 1, wherein the estimated performance curve and the uncertainty range assigned to each value of the performance curve as well as the data point to be evaluated are output on a graphical user interface.

11. The method as claimed in claim 1, wherein the mechanical damage is a bearing damage or a misalignment of axles of the machine or an imbalance of the machine.

12. A computer program product, comprising a non-volatile computer-readable medium which can be loaded directly into a memory of at least one digital computer, comprising program code parts which, when the program code parts are executed by the at least one digital computer, cause the at least one digital computer to carry out the method as claimed in claim 1.

13. A condition monitoring device for detecting mechanical damage to a machine based on a performance indicator present at a rotation speed of the machine, comprising at least one processor configured to carry out the following steps:

using sensors on the machine to monitor sensor data comprising magnetic field data and vibration data;

receiving calibration data points during a calibration period, each comprising a value of the rotation speed of the machine and a performance characteristic value associated with the rotation speed, and which have been determined from the sensor data of the machine operated at one or more operating points, calibrating an AI-based Gaussian process regressor, by inputting the calibration data points received during the calibration period and outputting an estimated performance curve and an uncertainty range assigned to each value of the performance curve for all rotation speed values in a specified rotation speed range which indicate a normal state of the machine, receiving a data point to be evaluated in an evaluation period after the calibration period, and comparing the data point to be evaluated with the estimated performance curve, and outputting an anomaly message if the data point to be evaluated is outside at least one specified limit value, which is dependent on the uncertainty range of the performance characteristic value.

\* \* \* \* \*